US011575165B2

(12) United States Patent
Antwerpen et al.

(10) Patent No.: US 11,575,165 B2
(45) Date of Patent: Feb. 7, 2023

(54) ELECTRICAL ENERGY STORAGE UNIT FOR A MOTOR VEHICLE, AND METHOD FOR OPERATING SUCH AN ELECTRICAL ENERGY STORAGE UNIT

(71) Applicant: Bayerische Motoren Werke Aktiengesellschaft, Munich (DE)

(72) Inventors: Korbinian Antwerpen, Unterschleissheim (DE); Martin Mittermaier, Munich (DE); Simon Nuernberger, Bad Aibling (DE); Carsten Spengler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 62 days.

(21) Appl. No.: 17/194,520

(22) Filed: Mar. 8, 2021

(65) Prior Publication Data
US 2021/0320347 A1    Oct. 14, 2021

(30) Foreign Application Priority Data

Apr. 8, 2020 (DE) ..................... 10 2020 109 872.3

(51) Int. Cl.
*H01M 10/00* (2006.01)
*H01M 10/6556* (2014.01)
(Continued)

(52) U.S. Cl.
CPC ..... *H01M 10/6556* (2015.04); *H01M 10/615* (2015.04); *H01M 10/625* (2015.04); *H01M 10/6567* (2015.04); *H01M 2220/20* (2013.01)

(58) Field of Classification Search
CPC ........... H01M 10/6556; H01M 10/615; H01M 10/625; H01M 10/6567; H01M 10/058;
(Continued)

(56) References Cited

U.S. PATENT DOCUMENTS 5,834,131 A * 11/1998 Lutz ..................... H01M 10/623
429/7
5,990,660 A * 11/1999 Meissner ............ H01M 10/615
320/127
(Continued)

FOREIGN PATENT DOCUMENTS

CN          106207025 A      12/2016
DE     10 2005 022 204 B4    4/2014
(Continued)

OTHER PUBLICATIONS

German-language Search Report issued in German Application No. 10 2020 109 872.3 dated Nov. 23, 2020 with partial English translation (10 pages).
(Continued)

*Primary Examiner* — Nicholas P D'Aniello
(74) *Attorney, Agent, or Firm* — Crowell & Moring LLP

(57) ABSTRACT

An electrical energy storage unit for a motor vehicle, having at least one storage unit cell designed to store electrical energy, which storage unit cell has a cell housing in which an electrolyte and an electrode device are arranged, and having a temperature control device that has at least one temperature control channel arranged outside the cell housing, which temperature control channel is able to be flowed through by a temperature control fluid in order to control the temperature of the storage unit cell. At least one heating device is able to be supplied with the electrical energy stored in the storage unit cell and thereby able to be electrically operated. By way of the heating device, the storage unit cell is able to be heated, wherein the heating device is able to be operated without any damage only when the storage unit cell has a state of charge that is not more than 60% of the maximum state of charge of the storage unit cell.

13 Claims, 5 Drawing Sheets

(51) Int. Cl.
*H01M 10/615* (2014.01)
*H01M 10/625* (2014.01)
*H01M 10/6567* (2014.01)

(58) Field of Classification Search
CPC .......... H01M 10/613; H01M 10/0525; H01M 10/654; H01M 10/6557; H01M 10/655; H01M 10/6568; H01M 10/63; H01M 10/647; H01M 10/657; H01M 2220/20; Y02E 60/10
See application file for complete search history.

(56) References Cited

U.S. PATENT DOCUMENTS

| | | |
|---|---|---|
| 2005/0274705 A1 | 12/2005 | Zhu et al. |
| 2014/0287293 A1 | 9/2014 | Gross |
| 2017/0098874 A1* | 4/2017 | Shen .................. H01M 10/486 |
| 2019/0084435 A1* | 3/2019 | Grace ................ H01M 10/482 |

FOREIGN PATENT DOCUMENTS

| | | |
|---|---|---|
| DE | 10 2013 102 867 A1 | 10/2014 |
| DE | 10 2017 213 250 A1 | 2/2019 |
| DE | 10 2017 219 552 A1 | 5/2019 |
| DE | 10 2018 200 608 A1 | 7/2019 |
| WO | WO 2012/153230 A1 | 11/2012 |

OTHER PUBLICATIONS

German-language Decision to Grant Issued in German Application No. 10 2020 109 872.3 dated Dec. 7, 2020 with English translation (14 pages).

Chinese Office Action issued in Chinese application No. 202110273712.0 dated Jan. 5, 2022, with English translation (Seventeen (17) pages).

* cited by examiner

ELECTRICAL ENERGY STORAGE UNIT FOR A MOTOR VEHICLE, AND METHOD FOR OPERATING SUCH AN ELECTRICAL ENERGY STORAGE UNIT

CROSS REFERENCE TO RELATED APPLICATION

This application claims priority under 35 U.S.C. § 119 from German Patent Application No. 10 2020 109 872.3, filed Apr. 8, 2020, the entire disclosure of which is herein expressly incorporated by reference.

BACKGROUND AND SUMMARY OF THE INVENTION

The invention relates to an electrical energy storage unit for a motor vehicle. The invention furthermore relates to a method for operating such an electrical energy storage unit.

DE 10 2017 213 250 A1 discloses a battery module having at least one battery cell and having a cooling plate that is thermally conductively connected to the at least one battery cell. A thermal compensation layer, which is designed to increase the thermal conductivity between the battery cell and the cooling plate, is arranged between the battery cell and the cooling plate. DE 10 2017 219 552 A1 furthermore discloses a battery module having a plurality of battery cells. The battery cells are electrically conductively connected to one another in series and/or in parallel.

The object of the present invention is to provide an electrical energy storage unit for a motor vehicle and a method for operating such an electrical energy storage unit, such that particularly advantageous temperature control of the energy storage unit is able to be achieved.

This and other objects are achieved according to the invention by an electrical energy storage unit and by a method having the features of the independent claims. Advantageous refinements of the invention are the subject of the dependent claims.

A first aspect of the invention relates to an electrical energy storage unit for a motor vehicle, in particular for a motor vehicle that is preferably designed as a passenger motor vehicle. This means that the motor vehicle, in its fully manufactured state, has the electrical energy storage unit. The motor vehicle furthermore has, in its fully manufactured state, at least one electric machine by way of which the motor vehicle is able to be driven electrically, in particular fully electrically. The motor vehicle is thus preferably a hybrid vehicle or else an electric vehicle, in particular a battery electric vehicle (BEV). In order to drive the motor vehicle electrically, in particular fully electrically, by way of the electric machine, the electric machine is for example operated or able to be operated in a motor mode and is thus operated or able to be operated as an electric motor. In this case, electrical energy, that is to say electric current, is stored in the energy storage unit or by way of the energy storage unit. In order to operate the electric machine in the motor mode, the electric machine is supplied or is able to be supplied with electrical energy stored in the energy storage unit. Since the motor vehicle is able to be driven by way of the electric machine, the electric machine is also referred to as traction machine. Since the electric machine is supplied with electrical energy stored in the energy storage unit in order to drive the motor vehicle electrically, in particular fully electrically, the energy storage unit is also referred to as traction storage unit or else traction battery, in particular when the energy storage unit is designed as a battery. This means that the energy storage unit may be designed as a battery or as an accumulator battery, in particular as a lithium-ion battery or accumulator battery. The electric machine and the energy storage unit are preferably high-voltage components (HV components) whose respective electric voltage, in particular electric operating or nominal voltage, is preferably at least 48 volts and very preferably greater than 50 volts, in particular greater than 60 volts. The electric voltage, in particular the electric operating or nominal voltage, is preferably several hundred volts, in order thereby to be able to achieve particularly great electric powers for the electric driving, in particular fully electric driving, of the motor vehicle. The energy storage unit may thus be designed in particular as a high-voltage battery (HV battery). It is in particular conceivable for the electric machine also be able to be operated in a generator mode, and thus as a generator. The generator converts kinetic energy of the moving motor vehicle into electrical energy that is provided by the generator. The electrical energy provided by the generator may be stored in the energy storage unit and provided again later.

The electrical energy storage unit has at least one storage unit cell by way of which electrical energy, that is to say electric current, is able to be stored, in particular electro-chemically stored. The storage unit cell is in particular designed as a battery cell, in particular as a lithium-ion cell, and is also referred to simply as cell. The energy storage unit may in particular have a plurality of storage unit cells that are electrically connected to one another and are thereby connected or able to be connected to one another in series and/or in parallel. The above and below explanations regarding the at least one storage unit cell may also readily be transferred to the other storage unit cells of the energy storage unit, and vice versa. The at least one storage unit cell has a cell housing in which an in particular liquid electrolyte and an electrode device are arranged, in particular at the same time. The electrolyte of course does not have to be liquid. It is also conceivable to use a solid electrolyte and/or a polymer electrolyte that is formed from at least one polymer.

This means for example that the cell housing may in particular directly delimit a reception space, wherein the electrode device and the electrolyte are arranged or received, in particular at the same time, in the reception space. The electrode device is in this case for example immersed at least partially, in particular at least predominantly or completely, in the electrolyte. This should be understood to mean in particular that the electrolyte is in direct contact with the electrode device. The electrode device may for example have at least or precisely two electrodes, in particular having a different electrical polarity. The electrode device and the electrolyte are thus for example combined to form a galvanic cell or form such a galvanic cell, by way of which the electrical energy is able to be stored, in particular electro-chemically stored. One of the electrodes is for example an anode, wherein the other of the electrodes is for example a cathode. A first of the electrodes is for example electrically connected to a first connection element of the storage unit cell, wherein a second of the electrodes is for example electrically connected to a second connection element of the storage unit cell. The electrodes are for example electrically insulated from one another. The connection elements are for example electrically insulated from one another. The connection elements may be arranged outside the cell housing, such that the electrodes are guided outwardly as it were via the connection elements, that is to say to surroundings of the cell housing. As a result, for example, one of the connection elements forms a positive electrical pole of the storage unit cell, wherein the other connection element for example forms a negative electrical pole of the storage unit cell. By way of the connection elements, also referred to as terminals, the storage unit cell is able to provide the electrical energy stored therein, or the electrical energy provided by the generator may be fed into the storage unit cell by the connection elements for storage and thus be stored in the storage unit cell.

The electrical energy storage unit furthermore has a temperature control device by way of which the temperature of the storage unit cell is able to be controlled, that is to say the storage unit cell is able to be heated and/or cooled. The temperature control device has at least one temperature control channel arranged outside the cell housing, wherein the temperature control device is arranged for example outside the cell housing. The temperature control channel is able to be flowed through by a temperature control fluid in order to control the temperature, that is to say in order to heat and/or cool, the storage unit cell. With regard to the above-mentioned plurality of storage unit cells, the temperature control device or the temperature control channel is for example arranged between respective adjacently or successively arranged cell housings of two of the storage unit cells, such that there is preferably provision for the temperature control device or the temperature control channel to be arranged outside all of the cell housings of the or all of the storage unit cells of the energy storage unit. The temperature control device is therefore also referred to for example as cell intermediate temperature controller or cell intermediate cooler, since the temperature control channel or the temperature control device is arranged between the storage unit cells or between the cell housings of the storage unit cells.

The storage unit cell may be cooled by way of the temperature control fluid for example in such a way that there is a transfer of heat from the storage unit cell, in particular from the cell housing, to the temperature control fluid. The storage unit cell may be heated by way of the temperature control fluid for example in such a way that there is a transfer of heat from the temperature control fluid to the storage unit cell, in particular to the cell housing.

In order then to be able to achieve particularly advantageous temperature control of the energy storage unit, there is provision according to the invention for the electrical energy storage unit to have at least one heating device that is able to be supplied with the electrical energy stored in the storage unit cell and is thereby able to be electrically operated. The heating device is thus an electrical heating device, that is to say an electrically operable heating device, by way of which the storage unit cell is able to be heated using the electrical energy originating from the storage unit cell, the heating device being supplied or being able to be supplied with this electrical energy. There is furthermore provision in this case according to the invention for the heating device to be able to be operated without any damage only when the storage unit cell or the energy storage unit has an overall state of charge that is not more than 60% of the maximum state of charge of the storage unit cell. There is in particular preferably provision for the heating device to be able to be operated without any interruption, that is to say continuously, and without any damage over or during an operating time only when the storage unit cell or the energy storage unit has an overall state of charge that is not more than 60% of the maximum state of charge of the storage unit cell, wherein the operating time is at most or precisely 30 minutes, in particular at most or precisely 15 minutes and very preferably at most or exactly five minutes. In particular when the heating device is designed as a cell intermediate heater, the operating time is preferably at most five minutes, in particular at most or precisely three minutes and very preferably at most or precisely two minutes. It has proven to be particularly advantageous, in particular when the heating device is designed as a cell-internal heater, for the operating time to be at most or precisely 60 seconds, in particular at most or precisely 30 seconds. This should be understood to mean in particular that, if the heating device were to be supplied with electrical energy stored in the storage unit cell and thereby operated at a state of charge of the storage unit cell greater than 60 percent of the maximum state of charge of the storage unit cell, before expiry of the operating time, the heating device would be damaged or destroyed, in particular burnt out, wherein the operating time begins when the storage unit cell begins to be operated, that is to say when the heating device begins to be supplied with electrical energy stored in the storage unit cell and is thereby operated.

The maximum state of charge of the storage unit cell should be understood to mean that the storage unit cell is completely charged with electrical energy when it reaches its maximum state of charge, such that no further electrical energy is able to be fed into the storage unit cell for storage. Expressed in yet other words, a greatest possible state of charge of the storage unit cell is at most 60 percent of the maximum state of charge of the storage unit cell, wherein the heating device is able to be operated over or during the operating time without any interruption and without any damage only when the storage unit cell or the energy storage unit has an overall state of charge that is not greater than the greatest possible state of charge. The in particular current state of charge of the storage unit cell is also referred to as SOC and denotes for example an in particular current amount of electrical energy stored in the storage unit cell. If the heating device were to be supplied with electrical energy stored in the storage unit cell and thereby operated in the case of an SOC of more than 60 percent, then the heating device, for example in the form of a heating resistor, would be damaged or destroyed, in particular burnt out, before the expiry of the operating time.

It may be identified overall that the invention combines the cell intermediate temperature controller with the heating device, which is designed or configured as described. It was found that, through this combination, it is possible overall to achieve particularly advantageous temperature control of the storage unit cell or of the energy storage unit, such that it is possible firstly to achieve particularly good what is known as fast charging of the energy storage unit. Secondly, the temperature of the energy storage unit may particularly advantageously be controlled during normal driving operation. Fast charging of the energy storage unit should in particular be understood to mean that electrical energy is fed into the energy storage unit for storage with an electric power, also referred to as charging power, and has a peak value in particular of at least 100 kilowatts, in particular at least 250 kilowatts, and in this case for example is in a range from 250 kilowatts inclusive to 350 kilowatts inclusive. The invention in particular makes use of the finding that the temperature control fluid, also referred to as temperature control medium, is able to be used as a heater for heating the storage unit cell, a heating power of the temperature control fluid however usually being limited to five to ten kilowatts. This is the case in particular for the entire energy storage unit. With regard to the respective storage unit cell, the heating power is limited for example to 10 to 30 watts per storage unit cell. Heating rates that are provided for the heating of the storage unit cell and that are able to be achieved by way of the temperature control device, that is to say by way of the temperature control fluid on its own, are thereby too low to be able to achieve the abovementioned fast charging or to perform or start it within a sufficiently short time. Sufficiently high heating rates for the fast charging are able to be achieved by way of the heating device on its own. The electrical heating device however has a conflict of interest in terms of its technical design. The electrical heating device may be designed either for low voltage levels and thus for low states of charge of the energy storage unit or of the storage unit cell, or else for high voltage levels and thus for high states of charge of the storage unit cell or of the energy storage unit. The maximum heating time for which the storage unit cell is able to be heated by way of the heating device, in particular continuously or without any interruption, is additionally limited, specifically by a temperature rise of the heating device itself, in particular its heating structure, that occurs in the case of the heating of the storage unit cell brought about by the heating device. The heating device or its heating structure for heating the storage unit cell should not become hotter than a limit temperature, since otherwise materials, such as for example an adhesive layer or an insulating layer of the storage unit cell and/or other cell components of the storage unit cell, could be damaged. If the heating device is designed for lower states of charge, then the full heating time is only possible there. In the case of comparatively high states of charge, the maximum possible heating time is greatly restricted, since otherwise the heating device or its heating structure becomes too hot. In the case of high states of charge, a heating power of the heating device is higher than in the case of low states of charge, as a result of which the maximum temperature is reached faster.

A further finding on which the invention is based is, for example, that when the current state of charge of the storage unit cell has a first value, the storage unit cell has or provides a first electric voltage that is present for example at the heating device. If the current state of charge of the storage unit cell however has for example a second value that is lower than the first value, then the storage unit cell has a second electric voltage that is lower than the first electric voltage, or the storage unit cell provides the second electric voltage that is lower than the first electric voltage and that is present for example at the heating device. High states of charge of the storage unit cell thus lead to high voltage levels that are present at the heating device or with which the heating device is able to be operated, and low states of charge of the storage unit cell lead to low states of charge that are present at the heating device or with which the heating device is able to be operated. If the heating device is designed for example for a high, greatest possible state of charge, then, although the heating device could be operated at states of charge of the storage unit cell greater than 60 percent of the maximum state of charge of the storage unit cell without any interruption and without any damage during the operating time, an in particular internal electrical resistance of the heating device would then for example be so great that the heating device, at low states of charge, would not be able to be operated or would be able to be operated only in such a way that there would be only insufficient heating power. On the other hand, although, in the case of low current states of charge of the storage unit cell, sufficiently high heating rates could be achieved, in the case of very high states of charge, the heating device would be damaged, in particular burnt out, before the expiry, that is to say before the end of the operating time.

By virtue of the combination, provided according to the invention, of cell intermediate temperature controller and heating device, the abovementioned conflict of interest is able to be confronted, since the heating device, designed for example as a cell intermediate heater having a heating power of for example 200 watts per storage unit cell or as a cell-internal heater having for example a heating power of up to 400 watts per storage unit cell, is designed or is able to be operated particularly efficiently in the case of SOCs that are less than or equal to 60 percent of the maximum state of charge. This thereby allows a particularly high heating effect for the or in the case of the fast charging, in particular including when the current state of charge of the storage unit cell is less than 60 percent of the maximum state of charge. By virtue of the combination of the heating device with the efficient cell intermediate temperature controller, which may work for example with a supply temperature of 30 degrees Celsius, the temperature control medium may serve as heater, in particular by heating the temperature control medium. The temperature control medium or the cell intermediate temperature controller may in this case for example have a heating power that is in a range from ten watts inclusive to 25 watts inclusive per storage unit cell. Heating of the temperature control fluid may in particular be understood to mean that the temperature control fluid is able to be heated or is heated, in particular actively, using electrical energy, for example by way of a further heater that is provided in addition to the heating device and differs from heating device. The supply temperature of the temperature control fluid should in particular be understood to mean for example that the temperature control fluid is introduced into the temperature control channel at the supply temperature, whereupon the temperature control fluid flows through the temperature control channel and accordingly controls the temperature of the storage unit cell, in particular heats it. The supply temperature may for example be in a range from 30 degrees Celsius inclusive to 35 degrees Celsius inclusive. When it leaves the temperature control channel, in particular when the temperature control fluid has heated the storage unit cell, it has an exit temperature that is for example lower than the supply temperature.

The heating of the storage unit cell able to be brought about by way of the temperature control medium, when the current state of charge of the storage unit cell is greater than the greatest possible state of charge, may for example heat the storage cell or support the heating device where this is not able to be operated or is able to be operated only for a short time. In the case of states of charge of the storage unit cell higher than the greatest possible state of charge, the motor vehicle is driven normally, wherein in this case heating rates that are not as great or as fast as in the case of fast charging may be necessary. The temperature control fluid, in particular with or without circulation of the temperature control fluid, may generally help to achieve a sufficiently high heating time, since the temperature control medium may function as cooling medium and thus as a heat sink in order to prevent overheating of the heating device.

It has proven to be particularly advantageous for the heating device to be able to be operated without any damage, in particular without any interruption and without any damage during the operating time, only when the storage unit cell has a state of charge, in particular during the entire operating time, that is not more than 50%, in particular not more than 40%, of the maximum state of charge of the storage unit cell. Particularly advantageous temperature control, in particular heating, of the storage unit cell, and accordingly particularly advantageous fast charging, is thereby able to be achieved.

A further embodiment is distinguished in that the heating device has at least one electrical heating element arranged outside the cell housing. The heating device is thus designed for example as a cell intermediate heater by way of which it is possible firstly to achieve particularly advantageous heating of the storage unit cell. Secondly, a particularly simple and thus inexpensive construction of the storage unit cell or of the energy storage unit is able to be achieved overall. This means that the cell intermediate heater is not arranged in the cell housing or is not arranged inside the cell housing, but rather is arranged outside the cell housing, and in this case for example between the cell housings of the storage unit cells.

A check as to whether the heating device is able to be operated without any damage only when the storage unit cell has a state of charge that is not more than 60%, in particular 50% and very particularly 40%, of the maximum state of charge of the storage unit cell takes place for example in such a way that a state of charge lower than 60%, 50% or 40% of the maximum state of charge or an in particular current state of charge of the storage unit cell that corresponds to 60%, 50% or 40% of the maximum state of charge is set and is kept at least substantially constant, for example during the entire operating time during which the heating device is supplied with electrical energy stored in the storage unit cell. If the heating device in this case survives the operating time undamaged, then for example a state of charge of the storage unit cell greater than 60%, 50% or 40% of the maximum state of charge is set and kept at least substantially constant. The heating device is then supplied with energy stored in the storage unit cell. If the heating device is damaged or destroyed before the end of the operating time, then the invention is achieved.

There is thus preferably provision for the heating device per se, that is to say on its own and in this case in particular considered without the temperature control device or the operation thereof, to be able to be operated without any damage only when the storage unit cell has a state of charge that is not more than 60% of the maximum state of charge of the storage unit cell. There is thus preferably provision, in the case of the abovementioned check, for temperature control of the heating device that is brought about in a targeted manner by the temperature control device to be omitted, such that the heating device is checked in a manner considered on its own. It is thus conceivable in principle for the heating device per se, that is to say considered on its own and without operation of the temperature control device taking place, to be supplied with electrical energy stored in the storage unit cell without any damage and thereby operated briefly and thus during a time interval shorter than the operating time without any interruption or continuously in the case of states of charge of the storage unit cell higher or greater than the greatest possible state of charge of the storage unit cell. Such operation of the heating device per se that takes place in the case of states of charge of the storage unit cell greater than the greatest possible state of charge is however not possible without any interruption over the entire operating time and without any damage with regard to the heating device, since the state of charge of the storage unit cell and thus its voltage level would then be too high in order to be able to operate the heating device on its own, that is to say considered on its own, during the stated operating time without any interruption and without any damage.

In order to be able to achieve particularly effective heating of the storage unit cell, there is provision, in a further refinement of the invention, for the heating device to have at least one electrical heating element arranged inside the cell housing. The heating element is in this case for example formed from a heating foil that is integrated into the storage unit cell or into the cell housing.

It has proven to be particularly advantageous in this case for the electrical heating element arranged inside the cell housing, the electrode device and the electrolyte to be arranged at the same time in a reception space delimited by the cell housing, in particular in such a way that the electrolyte is in direct contact with at least part of the electrical heating element. Particularly fast and effective heating of the storage unit cell is thereby able to be guaranteed.

In a further refinement of the invention, there is provision for the maximum temperature of the heating device to be in a range from 60° C. inclusive to 90° C. inclusive, preferably to be 70° C. The maximum temperature of the heating device, when the heating device is designed as an external cell intermediate heater, that is to say one arranged outside the cell housing, and in particular when the storage unit cell is designed as a lithium-ion cell and/or the electrolyte is a liquid electrolyte, is preferably 70° C. The maximum temperature of the heating device when the heating device is designed as an internal cell-internal heater, that is to say one arranged inside the cell housing, and in particular when the storage unit cell is designed as a lithium-ion cell and/or the electrolyte is a liquid electrolyte, is preferably 60° C. If for example the electrolyte is a solid electrolyte, then the maximum temperature is for example 90° C. Excessive temperatures and resultant damage are thereby able to be reliably avoided.

In order to be able to achieve particularly efficient and effective temperature control of the storage unit cell, a further configuration of the invention makes provision for the temperature control fluid to be a liquid. The liquid preferably at least partially, in particular at least predominantly or fully, comprises water. It is furthermore conceivable for the liquid to contain at least one alcohol. The liquid may thus be a mixture that may comprise at least water and at least one alcohol. The liquid may in particular be a non-electrically conductive liquid such as for example an oil or comprise at least one or more oils.

In a further embodiment of the invention, there is provision for the storage unit cell to be received in a storage unit housing of the electrical energy storage unit that is formed separately from the storage unit cell. In this case, there may in particular be provision for the abovementioned plurality of storage unit cells to be received in the storage unit housing, wherein the storage unit housing is formed separately from the storage unit cells and in particular their cell housings.

In order to achieve targeted guidance of the temperature control fluid and thus effective and efficient temperature control, in one embodiment of the invention, there is provision for the temperature control channel to be completely formed or delimited, at least in a length region of the temperature control channel, by a temperature control element that is formed separately from the storage unit housing and separately from the cell housing and received in the storage unit housing, wherein the temperature control element is arranged for example between two of the storage unit cells. Effective and efficient cell intermediate temperature control may thereby be achieved.

It has furthermore proven to be particularly advantageous for the temperature control channel to be at least partially delimited directly by the storage unit housing. What is called immersion cooling or immersion temperature control of the storage unit cell or of the storage unit cells is thereby able to be achieved. This should in particular be understood to mean that the temperature control fluid received in the temperature control channel or flowing through the temperature control channel forms a temperature control bath, also referred to bath, in the storage unit housing, in which bath the storage unit cell or the storage unit cells is or are received.

A second aspect of the invention relates to a method for operating an electrical energy storage unit for a motor vehicle. In the method, the energy storage unit has at least one storage unit cell designed to in particular electrochemically store electrical energy or electric current, which storage unit cell has a cell housing. An in particular liquid electrolyte is arranged in the cell housing. An electrode device of the storage unit cell is also arranged in the cell housing. In the method, the energy storage unit also has a temperature control device that comprises at least one temperature control channel arranged outside the cell housing, which temperature control channel is able to be flowed through or is flowed through by a temperature control fluid in order to control the temperature of the storage unit cell.

In order then to be able to particularly effectively and efficiently control the temperature of the energy storage unit, that is to say to be able to heat and/or cool it, there is provision according to the invention for the energy storage unit to have at least one heating device that is able to be supplied or is supplied with electrical energy stored in the storage unit cell and thereby to be able to be electrically operated or to be electrically operated. The storage unit cell is able to be heated by way of the heating device using the electrical energy originating from the storage unit cell. The heating device is in this case able to operate without any damage only when the storage unit cell has a state of charge that is not more than 60% of the maximum state of charge of the storage unit cell. Advantages and advantageous configurations of the first aspect of the invention should be considered to be advantages and advantageous configurations of the second aspect of the invention, and vice versa.

It has furthermore proven to be advantageous when the temperature control fluid is used as heating fluid at least during a time interval, by way of which heating fluid the storage unit cell is heated, in particular while the storage unit cell is heated by way of the heating device. There is in particular provision in this case for the temperature control fluid to circulate during the time interval. This should be understood to mean in particular that targeted cooling of the temperature control fluid is omitted during the time interval, in particular during the entire time interval. In other words, the energy storage unit comprises for example a fluid circuit able to be flowed through by the temperature control fluid and in which at least one cooler for the targeted cooling of the temperature control fluid is arranged. Circulation should be understood to mean in particular that the temperature control fluid bypasses the cooler or all of the coolers arranged in the fluid circuit and provided for the targeted cooling of the temperature control fluid and thus, after the temperature control fluid has flowed away from the storage unit cell and has for example flowed out of the temperature control channel, is fed back to the temperature control channel or the storage unit cell without being cooled in a targeted manner by way of a cooler. This makes it possible to achieve particularly high heating rates, such that the abovementioned fast charging is able to be achieved particularly well.

Other objects, advantages and novel features of the present invention will become apparent from the following detailed description of one or more preferred embodiments when considered in conjunction with the accompanying drawings.

BRIEF DESCRIPTION OF THE DRAWINGS

In the figures, identical or functionally identical elements are provided with the same reference signs.

DETAILED DESCRIPTION OF THE DRAWINGS

Figure 1:
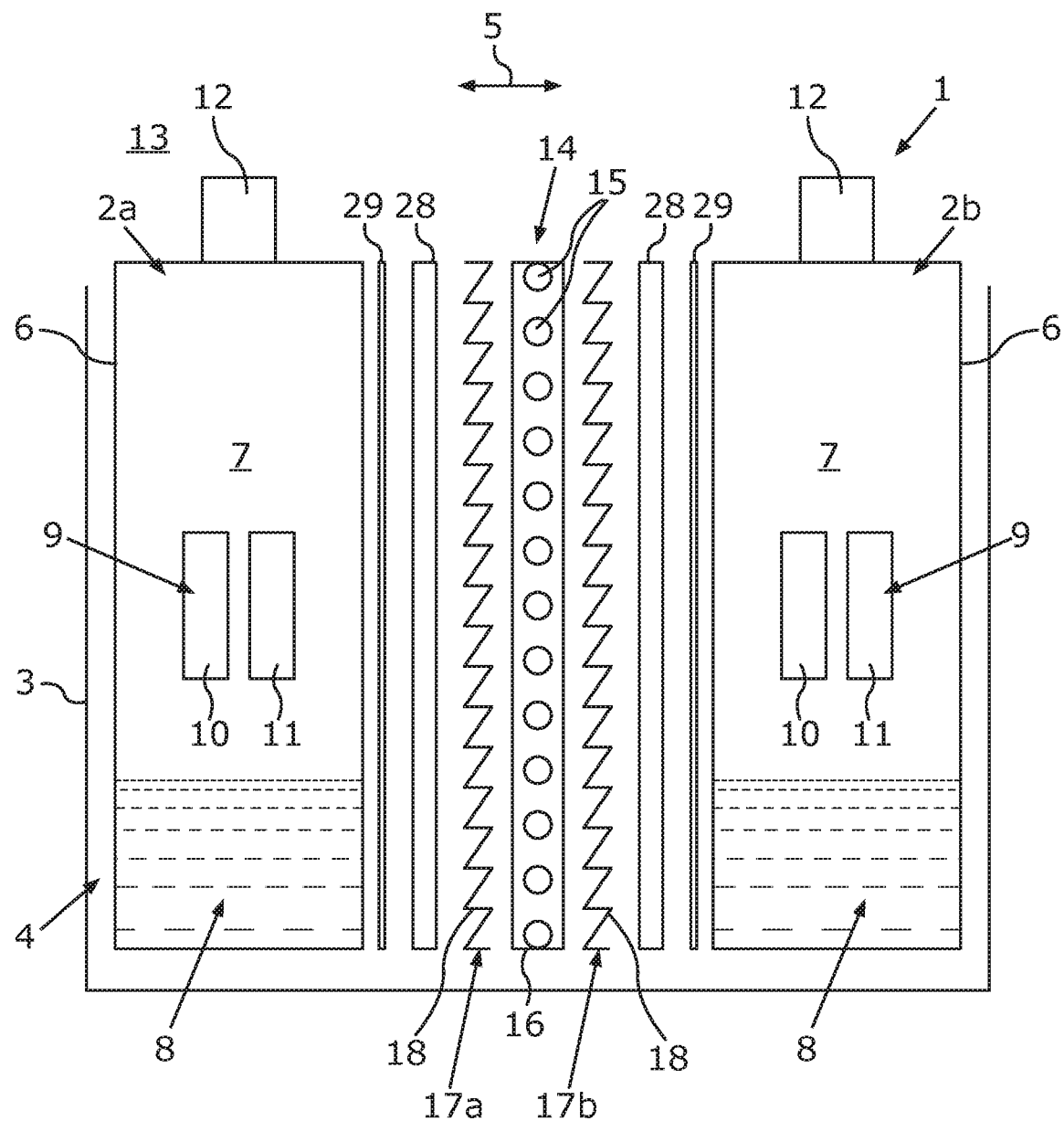
FIG. 1 shows a cutout of a schematic, side-on and sectional exploded view of an energy storage unit according to the invention, according to a first embodiment.

FIG. 1 shows a cutout of a schematic, side-on and sectional exploded view of an electrical energy storage unit 1 for a motor vehicle, in particular for a motor vehicle designed for example as a passenger motor vehicle. The electrical energy storage unit 1 is also referred to as energy storage unit or storage unit device and is designed to store electrical energy or electric current. The motor vehicle, in its fully manufactured state, has the energy storage unit 1 and at least one electric machine, by way of which the motor vehicle is able to be driven electrically, in particular fully electrically. In order to drive the motor vehicle electrically by way of the electric machine, the electric machine is operated in a motor mode and thus as an electric motor. To this end, the electric machine is supplied with electrical energy that is stored in the energy storage unit 1. The energy storage unit 1 has a plurality of, and thus at least two, storage unit cells 2a, b, wherein the above and below explanations regarding the storage unit cell 2a may also be readily transferred to the storage unit cell 2b, and vice versa. In this case, FIG. 1 illustrates a first embodiment of the energy storage unit 1. The energy storage unit 1 furthermore has a storage unit housing 3 that is formed separately from the storage unit cells 2a, b. The storage unit cells 2a, b are in this case arranged at least partially, in particular at least predominantly or completely, in the storage unit housing 3, that is to say in a housing space 4 that is formed or delimited, in particular directly, by the storage unit housing 3. The storage unit cells 2a, b are in particular arranged in a row, that is to say next to one another, along a direction illustrated in FIG. 1 by a double-headed arrow 5. The direction illustrated by the double-headed arrow 5 is for example a stacking direction, along which the storage unit cells 2a, b are arranged in a row. In this case, the storage unit cells 2a, b for example form a cell stack.

The respective storage unit cell 2a, b has a cell housing 6 that in particular directly delimits a respective reception space 7. The respective storage unit cell 2a, b furthermore contains an electrolyte 8, illustrated particularly schematically in FIG. 1, that is arranged in the respective reception space 7 and thus in the cell housing 6. The respective storage unit cell 2a, b furthermore has an electrode device 9, illustrated particularly schematically in FIG. 1, that is arranged in the respective reception space 7 and thus in the respective cell housing 6. It is conceivable in this case for the respective electrode device 9 to be in at least partial contact with the electrolyte 8. The respective electrode device 9 has at least or precisely two electrodes 10 and 11. The electrode 10 has for example a first electrical polarity, wherein the electrode 11 has for example a second electrical polarity different from the first electrical polarity. The electrodes 10 and 11 are in particular for example electrically insulated from one another.

The respective storage unit cell 2a, b furthermore has two connection elements, also referred to as terminals, of which one connection element, denoted 12, may be seen in FIG. 1. As may be seen from the example of the connection element 12, the terminals are arranged outside the cell housing 6 and thus in surroundings 13 of the respective storage unit cell 2a, b, wherein the terminals of the respective storage unit cell 2a, b are preferably arranged in the housing space 4. One of the electrodes 10 and 11 is for example electrically connected to a first of the terminals, wherein the respective other electrode 11 or 10 is electrically connected to the respective other terminal. A first of the terminals thereby forms for example a positive electrical pole of the respective storage unit cell 2a, b, wherein for example the second terminal forms a negative electrical pole of the respective storage unit cell 2a, b. It is in particular conceivable for the storage unit cells 2a, b to be electrically connected to one another via their terminals and thereby connected to one another in parallel and/or in series. By way of their terminals, the storage unit cells 2a, b are able to provide electrical energy that is stored, in particular electrochemically stored, in the storage unit cells 2a, b.

The energy storage unit 1 furthermore has a temperature control device 14 associated with the storage unit cells 2a, b, which temperature control device is arranged at least partially, in particular at least predominantly or completely, along the direction between the storage unit cells 2a, b and in this case in particular between the cell housings 6 and is thus designed as a cell intermediate temperature controller. In the first embodiment shown in FIG. 1, the temperature control device 14 has a plurality of temperature control channels 15 that are each arranged outside the storage unit cells 2a, b, that is to say outside the cell housing 6. In this case, the temperature control channels 15 are arranged along the direction between the storage unit cells 2a, b and in this case between the cell housings 6. The temperature control channels 15 are furthermore able to be flowed through by a temperature control fluid, preferably in the form of a liquid, by way of which the temperature of the storage unit cells 2a, b is able to be controlled, that is to say they are able to be heated and/or cooled.

In the first embodiment shown in FIG. 1, the temperature control device 14 comprises a temperature control element 16 formed separately from the cell housings 6 and separately from the storage unit housing 3, which temperature control element is designed here as a temperature control plate, in particular as a cooling or heating plate. The feature whereby the temperature control element 16 or the temperature control device 14 is arranged along the direction between the storage unit cells 2a, b, also referred to simply as cells, or between the cell housings 6 should in particular be understood to mean that the cell housing 6 of the storage unit cell 2a, in the direction of the cell housing 6 of the storage unit cell 2b, is covered or overlapped at least partially, in particular at least predominantly or completely, by the temperature control device 14, in particular by the temperature control element 16, wherein the storage unit cell 2b or the cell housing 6 of the storage unit cell 2b, in the direction of the cell housing 6 of the storage unit cell 2a, is overlapped or covered at least partially, in particular at least predominantly or completely, by the temperature control device 14, in particular by the temperature control element 16. Accordingly, the cell housing 6 of the storage unit cell 2a in the direction of the cell housing 6 of the storage unit cell 2b and the cell housing 6 of the storage unit cell 2b in the direction of the cell housing 6 of the storage unit cell 2a is in each case overlapped or covered at least partially by the temperature control channels 15. For example, when the temperature control fluid is colder than the storage unit cells 2a, b or the cell housing 6, heat may be transferred from the cell housings 6 to the temperature control fluid, as a result of which the storage unit cells 2a, b are cooled. If the temperature control fluid is for example hotter than the cell housing 6, then heat may be transferred from the temperature control fluid to the cell housing 6, as a result of which the storage unit cells 2a, b are heated.

In order then to be able to control the temperature of the energy storage unit 1, in particular to heat it, in a particularly advantageous manner and as required, such that for example particularly advantageous fast charging of the energy storage unit 1 is able to be achieved, the energy storage unit 1 comprises at least or precisely one heating device 17a, b, in particular per storage unit cell 2a, b. The respective heating device 17a, b may have a respective electrical or electrically operable heating element 18, which may be designed as a heating structure or else be referred to as a heating structure. The heating device 17a, b or the respective heating element 18 is formed separately from the temperature control device 14 and separately from the cell housings 6. The respective heating device 17a, b, that is to say the respective heating element 18, is able to be supplied with electrical energy stored in the respective storage unit cell 2a, b and thereby able to be electrically operated, as a result of which heat for heating the respective storage unit cell 2a, b is able to be provided by way of the respective heating device 17a, b. It may be seen from FIG. 1 that the heating device 17a or its heating element 18 is arranged along the direction between the temperature control element 16 and the cell housing 6 of the storage unit cell 2a, such that for example the cell housing 6 of the storage unit cell 2a is overlapped or covered at least partially, in particular at least predominantly or completely, by the heating device 17a, in particular by the heating element 18 of the heating device 17a, in the direction of the temperature control element 16. The heating device 17b, in particular the heating element 18 of the heating device 17b, is accordingly arranged along the direction between the cell housings 6 of the storage unit cell 2b and the temperature control element 16, such that the cell housing 6 of the storage unit cell 2b is overlapped or covered at least partially, in particular at least predominantly or completely, by the heating device 17b, in particular by the heating element 18 of the heating device 17b, in the direction of the temperature control element 16. The above and below explanations regarding the heating device 17a or regarding the heating element 18 of the heating device 17a may also readily be transferred to the heating device 17b or to the heating element 18 of the heating device 17b, and vice versa.

In order to be able to supply the heating devices 17a, b with the electrical energy stored in the storage unit cells 2a, b and thereby to be able to operate them, the heating devices 17a, b are for example connected or able to be connected electrically to the storage unit cells 2a, b, in particular via their terminals.

There is furthermore provision for the heating devices 17a, b to be able to be operated without any damage, in particular without any interruption and without any damage over an operating time, only when the storage unit cells 2a, b each have a state of charge that is not more than 60 percent of the maximum state of charge of the respective storage unit cell 2a, b, that is to say that is less than or equal to 60 percent of the maximum state of charge of the respective storage unit cell 2a, b. The maximum state of charge of the respective storage unit cell 2a, b denotes a maximum amount of electrical energy able to be stored in the respective storage unit cell 2a, b, such that, when the respective storage unit cell 2a, b has its maximum state of charge, no further electrical energy is able to be stored in the respective storage unit cell 2a, b, that is to say no further electrical energy is able to be fed into the respective storage unit cell 2a, b for storage. Expressed in yet other words, the respective storage unit cell 2a, b, when it has its respective maximum state of charge, is fully charged. The abovementioned operating time is preferably five minutes, 15 minutes or 30 minutes. The operating time, in particular when the heating devices 17a, b are designed as cell intermediate heaters, is preferably at most five minutes, in particular at most or precisely three minutes and very preferably at most or precisely two minutes. It has proven to be particularly advantageous, in particular when the heating devices 17a, b are designed as cell-internal heaters, for the operating time to be at most or precisely 60 seconds, in particular at most or precisely 30 seconds. The feature whereby the respective heating device 17a, b is only able to be supplied with electrical energy stored in the storage unit cells 2a, b and thereby able to be operated without any damage, in particular only able to be supplied with electrical energy stored in the storage unit cells 2a, 2b and thereby able to be operated without any interruption and without any damage over a predefined operating time, should in particular be understood to mean that, if a current state of charge of the storage unit cells 2a, b is greater than 60 percent of the maximum state of charge of the storage unit cells 2a, b and in this case the heating devices 17a, b were to be supplied with electrical energy stored in the storage unit cells 2a, b and thereby operated, in particular without the temperature of the storage unit cells 2a, b or of the heating devices 17a, b being controlled by the temperature control device 14, before expiry, that is to say before the end of the operating time that begins in particular when the heating devices 17a, b begin to be supplied with electrical energy stored in the storage unit cells 2a, b and thereby operated, the respective heating devices 17a, b would be damaged or destroyed, in particular burnt out. The heating devices 17a, b may possibly be supplied with electrical energy from the storage unit cells 2a, b and thereby operated at a state of charge of the storage unit cells 2a, b greater than 60 percent of the maximum state of charge of the respective storage unit cell 2a, b, but not over the entire operating time, since the heating devices 17a, b would be damaged or destroyed, in particular burnt out, before expiry of the operating time.

Figure 2:
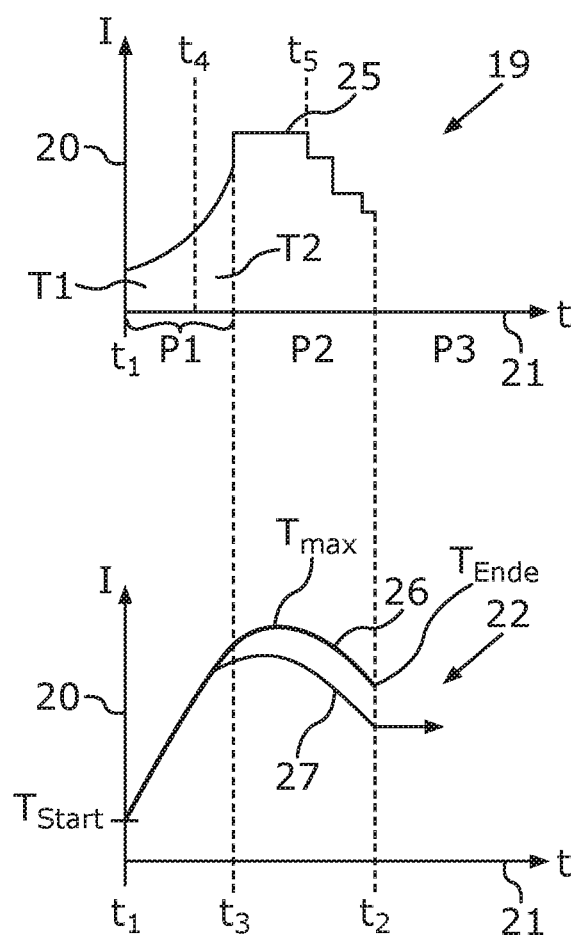
FIG. 2 shows graphs for illustrating a method according to the invention for operating the energy storage unit.

FIG. 2 shows a graph 19 on the ordinate 20 of which an electric charge current, which is fed into the storage unit cells 2a, b for storage, is plotted. The time is plotted on the abscissa 21 of the graph 19. The charge current is denoted I, and the time is denoted t. FIG. 2 furthermore shows a graph 22, on the ordinate 23 of which a temperature T of the storage unit cell 2a, b is plotted. The time t is likewise plotted on the abscissa 24. A curve 25 illustrates a temporal profile of the charge current, wherein curves 26 and 27 illustrate temporal profiles of the temperature T. The charge current I is fed into the storage unit cells 2a, b or into the energy storage unit 1 for storage for example during fast charging of the energy storage unit 1. The fast charging, also referred to as charging process, begins at a first time $t_1$. At the start of the charging process, the respective storage unit cell 2a, b has a starting temperature $T_{start}$. The greatest temperature of the storage unit cell 2a, b during the charging process is denoted $T_{max}$. The charging process ends at a second time $t_2$, at which the respective storage unit cell 2a, b has an end temperature $T_{end}$. The end temperature $T_{end}$ is lower than the greatest temperature $T_{max}$ and greater than the starting temperature $T_{start}$. A first phase P1 of the charging process extends from the first time $t_1$ to a time $t_3$ that is between the times $t_1$ and $t_2$. The first phase P1 is a heating phase and may have two sub-phases T1 and T2. During the sub-phase T1, which extends for example from the time $t_1$ to a time $t_4$ that is between the times $t_1$ and $t_3$, the storage unit cells 2a, b are heated for example by way of the electrical heating devices 17a, b. There may in particular be provision for the storage unit cells 2a, b to be heated only by way of the heating device 17a, b during the sub-phase T1, with regard to the heating devices 17a, b and the temperature control device 14. It is furthermore conceivable, in the phase P1, in particular in the first sub-phase T1, for the temperature control fluid to be heated to a supply temperature, also referred to as target supply temperature, that is for example in a range from 30 degrees Celsius to 35 degrees Celsius. This may be achieved for example by way of a heating device that is provided in addition to the heating devices 17a, b and is in particular electrically operable, and may be designed as a flow heater and/or arranged in the surroundings 13 and in this case in the storage unit housing 3 or outside the storage unit housing 3. There may thus be provision, during the sub-phase T1, for the storage unit cells 2a, b to be heated by way of the temperature control fluid and thus by way of the temperature control device 14, in particular by virtue of the supply temperature being greater than the temperature of the storage unit cells 2a, b. During the phase P1, in particular during the sub-phase T1, the temperature control fluid is for example circulated, as a result of which it is possible to avoid overheating of the heating devices 17a, b. This may allow a particularly high and in particular full heating time of for example 90 to 120 seconds. The target supply temperature of the temperature control fluid is in particular thereby able to be reached quickly. In parallel, it is possible to set a small charging current that is able to be raised in accordance with the temperature T of the storage unit cells 2a, b, in particular in accordance with a rise in the temperature T. After the target supply temperature has been exceeded, that is to say when the storage unit cells 2a, b are hotter than the temperature control fluid, a cooling effect brought about by the temperature control fluid may arise, as a result of which the storage unit cells 2a, b are cooled, in particular during the sub-phase T2. The sub-phase T2 ends at the time $t_3$. The end of the sub-phase T2 is the end of the phase P1, at the end of which a target starting temperature, advantageous for the actual fast charging, of the respective storage unit cell 2a, b is reached. The actual fast charging thus begins at the time $t_3$. A second phase P2, which is a cooling phase, starts with the actual fast charging and thus at the time $t_3$. The maximum charge current I is also present during the phase P2. During the cooling phase, heating, brought about by the heating device 17a, b and by the temperature control device 14, of the storage unit cells 2a, b is omitted, wherein the storage unit cells 2a, b during the phase P2 are cooled by way of the temperature control fluid and thus by way of the temperature control device 14, specifically to the full extent. As may be seen from FIG. 2, the charge current I has for example a stepped profile.

The phase P2 may be followed by a phase P3. The phase P3 begins at the time $t_2$, at which the phase P2 ends. After the highest current stage ends, this ending for example at a time $t_5$ between the times $t_3$ and $t_2$, the highest temperature $T_{max}$ is reached. After the highest current stage, an in particular step-shaped reduction of the charge current I takes place, and the storage unit cells 2a, b are cooled down to the end temperature $T_{end}$. The end temperature $T_{end}$ is then the temperature of the storage unit cells 2a, b at which the phase P3 and thus for example onward travel following the fast charging begins. It may be seen from FIG. 1 that an electrically insulating and thermally conductive layer 28 may be arranged between the respective heating element 18 and the respective cell housing 6, in particular along the direction. It is furthermore conceivable that an adhesive layer 29 may be arranged along the direction between the respective layer 28 and the respective cell housing 6.

Figure 3:
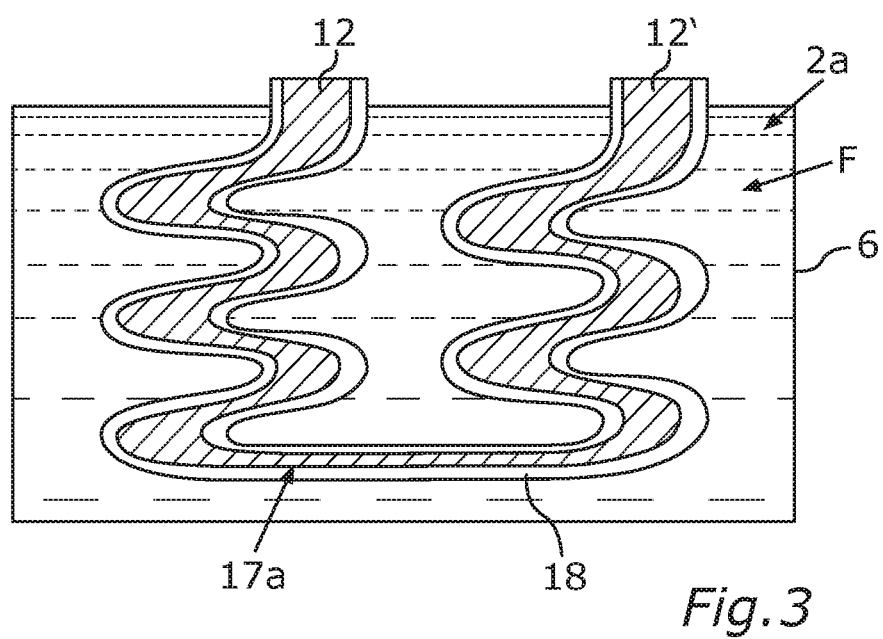
FIG. 3 shows a schematic sectional view of a storage unit cell of the energy storage unit according to a second embodiment.

FIG. 3 shows, for example, the storage unit cell 2a according to a second embodiment of the energy storage unit 1. FIG. 3 shows the connection element 12 and the second connection element, denoted 12' in FIG. 3, of the storage unit cell 2a. FIG. 3 furthermore shows that the heating element 18 may run at least substantially in meandering form and/or be electrically connected to the terminals (connection elements 12, 12'), as a result of which the heating element 18 or the heating device 17a is able to be supplied with electrical energy stored in the storage unit cell 2a and thereby able to be operated. In FIG. 3, a surface available for effectively cooling the storage unit cell 2a is denoted F. As an alternative or in addition, cooling may take place via the terminals, in particular when the surface F is not large enough.

Figure 4:
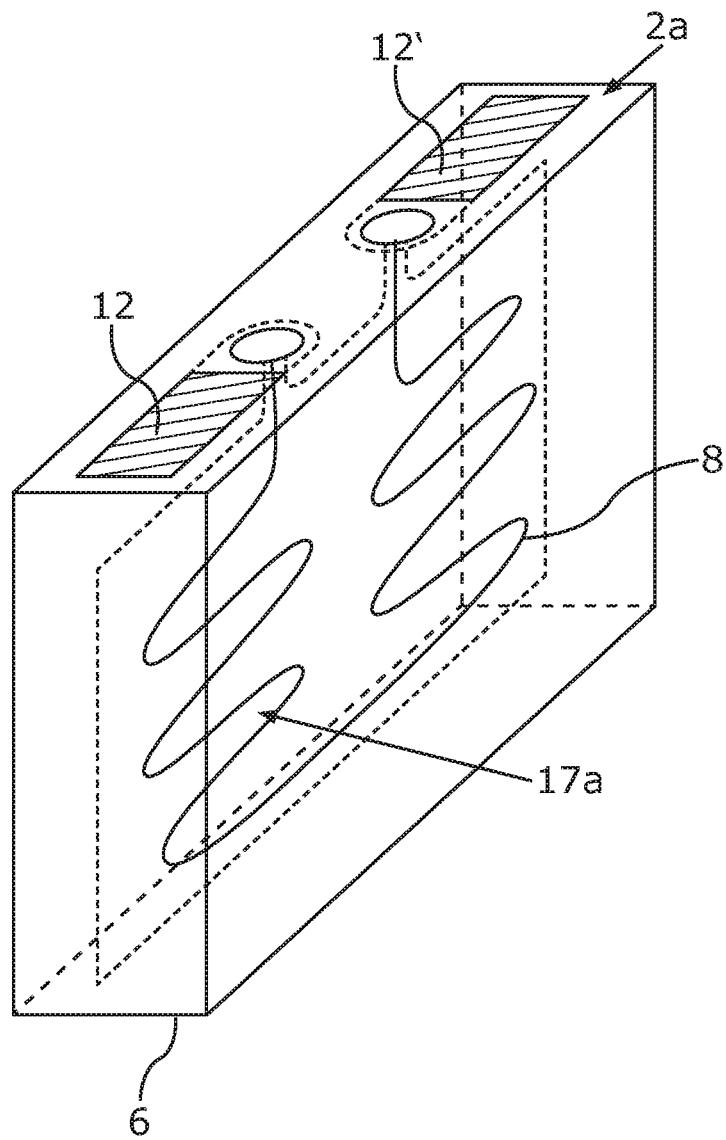
FIG. 4 shows a schematic perspective view of a storage unit cell of the energy storage unit according to a third embodiment.

FIG. 4 shows the storage unit cell 2a for a third embodiment of the energy storage unit 1. It may be seen from FIG. 4 that the storage unit cell 2a or the cell housing 6 may have a prismatic outer circumference and in this case in particular have a cuboidal design.

Figure 5:
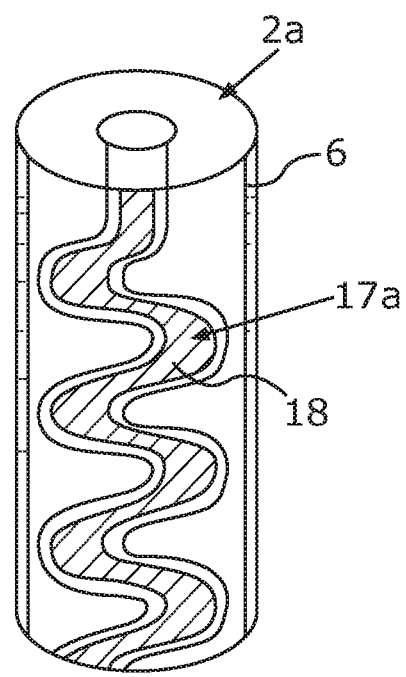
FIG. 5 shows a schematic perspective view of the energy storage unit according to a fourth embodiment.
Figure 6:
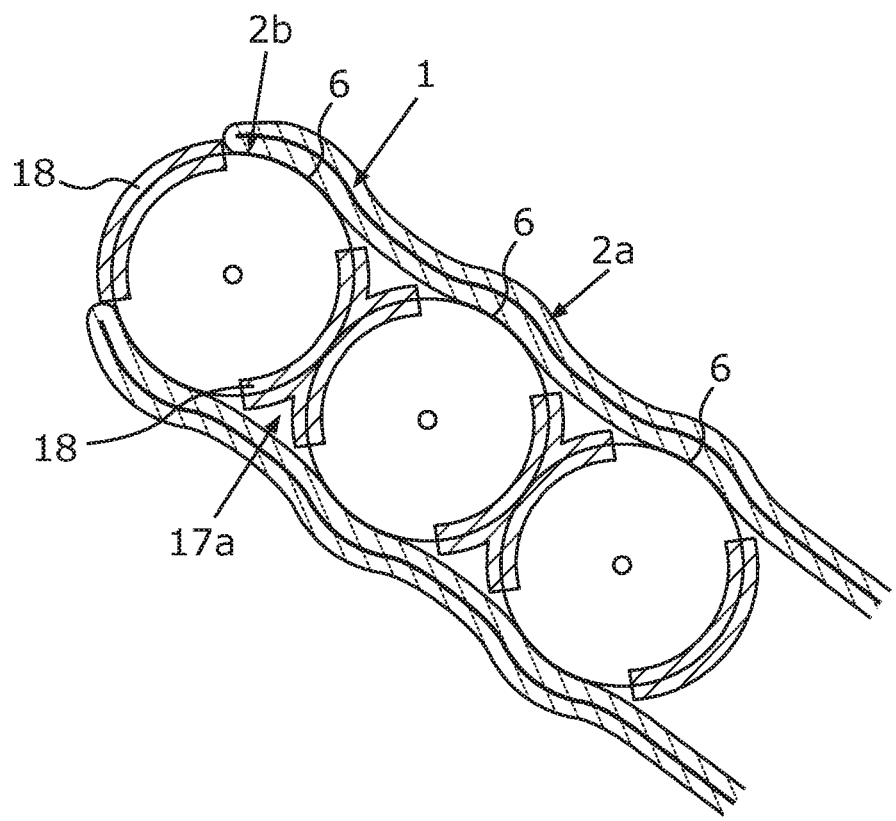
FIG. 6 shows a cutout of a schematic plan view of the energy storage unit according to the fourth embodiment.

FIGS. 5 and 6 show the storage unit cell 2a for a fourth embodiment of the energy storage unit 1. In the fourth embodiment, the storage unit cell 2a, in particular its cell housing 6, is designed with a round, in particular circular outer circumference. The heating device 17a in the fourth embodiment is furthermore designed as a cell-internal heater that is arranged inside the cell housing 6 and in this case in particular in the reception space 7. Particularly fast and effective heating of the storage unit cell 2a is thereby able to be achieved.

Figure 7:
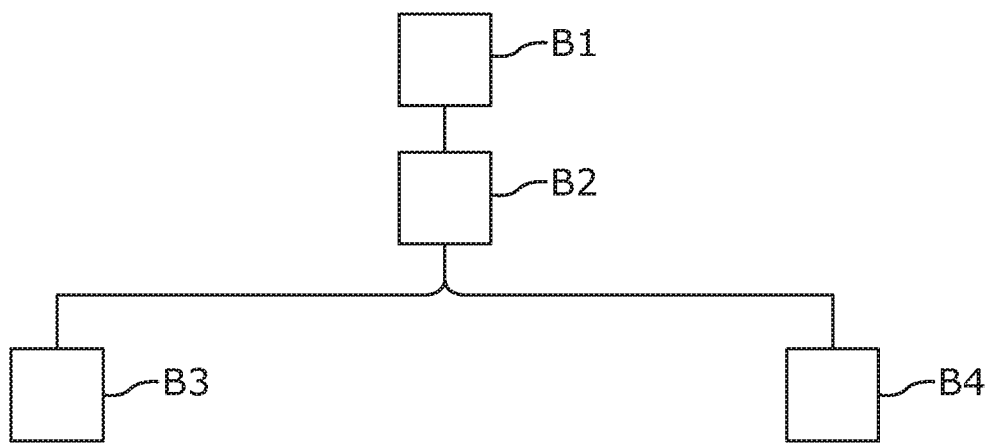
FIG. 7 shows a further graph for further illustrating the method.

FIG. 7 finally shows a further graph, in the form of a flowchart, for further illustrating the method. In a block B1, a possible driving scenario is analyzed. In a block B2, starting conditions and target variables are determined for all sections of a journey, in particular journey sections and charging processes. The determination performed in block B2 takes place for example on the basis of an initial state of charge of the storage unit cells 2a, b, of an initial temperature of the storage unit cells 2a, b, of a journey distance and of a route selection, of a desired setpoint state of charge or a setpoint range, a target time, or a target temperature at the end of the charging process. Starting from block B2, a distinction is drawn between travel of the motor vehicle and charging of the energy storage unit 1. In the case of travel, the method is continued with block B3. In the case of charging the energy storage unit 1, the method is continued with a block B4. In block B3, the driving route is analyzed, in particular with regard to a speed and acceleration profile. A required driving power and recuperation power are furthermore calculated over time and heating requirements and cooling requirements are derived. It may for example be determined that there is no cooling requirement. If there is a cooling requirement, then advantageous supply temperatures and volume flows are determined and set, in particular for temperature control fluids, whereupon cooling takes place with advantageous parameters. With regard to any heating requirements for the driving route, no heating requirement, a low heating requirement or a large heating requirement may be determined. When a low heating requirement is determined, it is determined for example whether the current state of charge of the storage unit cells 2a, b is greater or less than 60 percent of the maximum state of charge. If the current state of charge is less than 60 percent of the maximum state of charge, then maximum heating is performed by way of the heating devices 17a, b, for example, wherein heating is possibly also additionally performed by way of the temperature control device 14. If the current state of charge is for example greater than 60 percent of the maximum state of charge, then heating is performed by way of the temperature control device 14, and heating may likewise be performed for a short time interval by way of the heating device 17a, b, wherein the time interval is however shorter than the operating time, such that the heating device 17a, b is not damaged or destroyed—since the current state of charge is greater than 60% of the maximum state of charge. When it is determined that there is a large heating requirement, if the current state of charge is less than 60 percent of the maximum state of charge, maximum heating is performed for example by way of the heating device 17a, b and by way of the temperature control device 14. If, when a large heating requirement is determined, the current state of charge is greater than 60 percent of the maximum state of charge, then heating is performed by way of the temperature control device 14. Heating may be performed by way of the heating devices 17a, b, but only during a time interval that is shorter than the operating time.

The same may take place in block B4. In block B4, for example, a charging profile is calculated, and an advantageous starting temperature, an advantageous maximum temperature $T_{max}$ and an advantageous end temperature $T_{end}$ are determined. A solution is optimized for example with regard to a minimum risk, minimum temperature, best efficiency, in a time-optimized manner, matching a desire specified by the driver of the motor vehicle, for example with regard to a shortest charging time or a desired pause time of for example 20 minutes. Starting from block B4, a heating requirement and a cooling requirement are for example determined over time for the respective charging process. It may be determined that there is no cooling requirement. If it is determined for example that there is a cooling requirement, then advantageous supply temperatures, a volume flow of the temperature control fluid, etc. may be determined and set. Cooling may therefore be performed with advantageous parameters at an advantageous time.

With regard to the heating requirement, it may be determined that there is no heating requirement, a low heating requirement or a large heating requirement. If for example there is a low heating requirement, then it is determined whether the current state of charge of the storage unit cells 2a, b is less than or greater than 60 percent of the maximum state of charge of the storage unit cells 2a, b. If the state of charge is less than 60 percent of the maximum state of charge, then maximum heating is performed by way of the heating devices 17a, b, wherein heating is possibly also performed by way of the temperature control device 14. If the current state of charge is greater than 60 percent of the maximum state of charge, heating is performed for example by way of the temperature control device 14. Heating may be performed by way of the heating device 17a, b during a time interval, wherein the time interval is however shorter than the operating time and in particular short enough that damage or destruction of the heating devices 17a, b is avoided. If, in the course of determining a large heating requirement, it is determined that the current state of charge is less than 60 percent of the maximum state of charge, then heating is performed for example by way of the heating devices 17a, b and by way of the temperature control device 14. If the current state of charge is however greater than 60 percent of the maximum state of charge, then heating is performed for example by way of the temperature control device 14. Heating may be performed by way of the heating devices 17a, b, but only during a time interval that is shorter than the operating time and is in particular short enough that damage or destruction of the heating devices 17a, b is avoided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS 1 energy storage unit
2a, b storage unit cell
3 storage unit housing
4 housing space
5 double-headed arrow
6 cell housing
7 reception space
8 electrolyte
9 electrode device
10 electrode
11 electrode
12, 12' connection element
13 surroundings
14 temperature control device
15 temperature control channel
16 temperature control element
17a, b heating device
18 heating element
19 graph
20 ordinate
21 abscissa
22 graph
23 ordinate
24 abscissa
25 curve
26 curve
27 curve
28 layer
29 layer
B1 block
B2 block
B3 block
B4 block
F surface
I charge current
p1 phase
p2 phase
t time
T1 sub-phase
T2 sub-phase
$t_1$ time
$t_2$ time
$t_3$ time
$t_4$ time
$t_5$ time
$T_{start}$ starting temperature
$T_{end}$ end temperature
$T_{max}$ greatest temperature

What is claimed is:

1. An electrical energy storage unit for a motor vehicle, comprising:
    at least one storage unit cell configured to store electrical energy, which storage unit cell has a cell housing in which an electrolyte and an electrode device are arranged;
    a temperature control device that has a plurality of temperature control channels arranged outside the cell housing, which temperature control channels are flowed through by a temperature control fluid, wherein the temperature control device controls a temperature of the storage unit cell; and
    at least one heating device formed separately from the temperature control device and supplied with the electrical energy stored in the storage unit cell and thereby electrically operated, by way of which heating device the storage unit cell is heated, wherein
    the heating device is configured to be operated during a charging of the storage unit cell with an electric power that has a peak value of at least 100 kilowatts only when the storage unit cell has a state of charge that is not more than 60% of a maximum state of charge of the storage unit cell and only for at most an operating time of 30 minutes when the storage unit cell has the state of charge that is not more than 60% of the maximum state of charge of the storage unit cell.

2. The electrical energy storage unit according to claim 1, wherein the state of charge is not more than 50% of the maximum state of charge of the storage unit cell.

3. The electrical energy storage unit according to claim 1, wherein
    the state of charge is not more than 40% of the maximum state of charge of the storage unit cell.

4. The electrical energy storage unit according to claim 1, wherein
    the heating device has at least one electrical heating element arranged outside the cell housing.

5. The electrical energy storage unit according to claim 4, wherein
    the heating device has at least one electrical heating element arranged inside the cell housing.

6. The electrical energy storage unit according to claim 1, wherein the heating device has at least one electrical heating element arranged inside the cell housing.

7. The electrical energy storage unit according to claim 6, wherein
the electrical heating element arranged inside the cell housing, the electrode device and the electrolyte are arranged at the same time in a reception space delimited by the cell housing.

8. The electrical energy storage unit according to claim 1, wherein
a maximum temperature of the heating device is in a range from 60 degrees Celsius inclusive to 90 degrees Celsius inclusive.

9. The electrical energy storage unit according to claim 1, wherein
the temperature control fluid is a liquid.

10. The electrical energy storage unit according to claim 1, wherein
the storage unit cell is received in a storage unit housing of the electrical energy storage unit that is formed separately from the storage unit cell.

11. The electrical energy storage unit according to claim 10, wherein the temperature control channels, at least in a respective length region of the temperature control channels, are formed completely by a respective temperature control element formed separately from the storage unit housing and separately from the cell housing and received in the storage unit housing.

12. The electrical energy storage unit according to claim 10, wherein
the temperature control channels are delimited at least partially directly by the storage unit housing.

13. A method for operating an electrical energy storage unit for a motor vehicle, having at least one storage unit cell configured to store electrical energy, which has a cell housing in which an electrolyte and an electrode device are arranged, and having a temperature control device, which has a plurality of temperature control channels arranged outside the cell housing, which temperature control channels are flowed through by a temperature control fluid, wherein the temperature control device controls a temperature of the storage unit cell,
the method comprising:
supplying at least one heating device with the electrical energy stored in the storage unit cell to thereby be electrically operated, by way of which heating device the storage unit cell is heated, wherein
the heating device is configured to be operated during a charging of the storage unit cell with an electric power that has a peak value of at least 100 kilowatts only when the storage unit cell has a state of charge that is not more than 60% of a maximum state of charge of the storage unit cell and only for at most an operating time of 30 minutes when the storage unit cell has the state of charge that is not more than 60% of the maximum state of charge of the storage unit cell.

\* \* \* \* \*